No. 857,361.　　　　　　　　　　　　　　　PATENTED JUNE 18, 1907.
F. PILAIN.
GEARING.
APPLICATION FILED AUG. 15, 1905.

2 SHEETS—SHEET 1.

WITNESSES
C. W. Fowler
A. E. Powell

INVENTOR
FRANCOIS PILAIN
By Howson & Howson
ATTORNEYS.

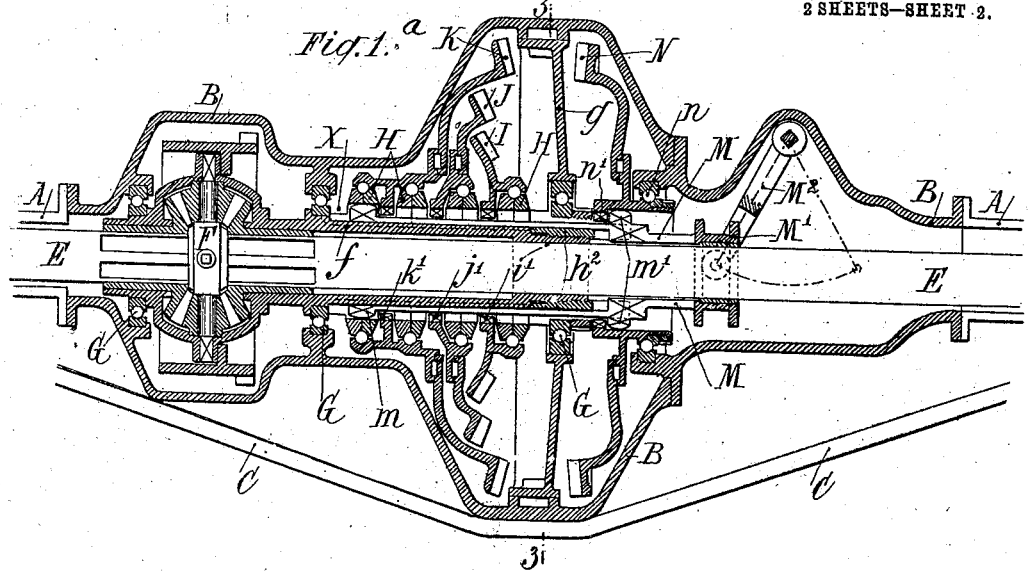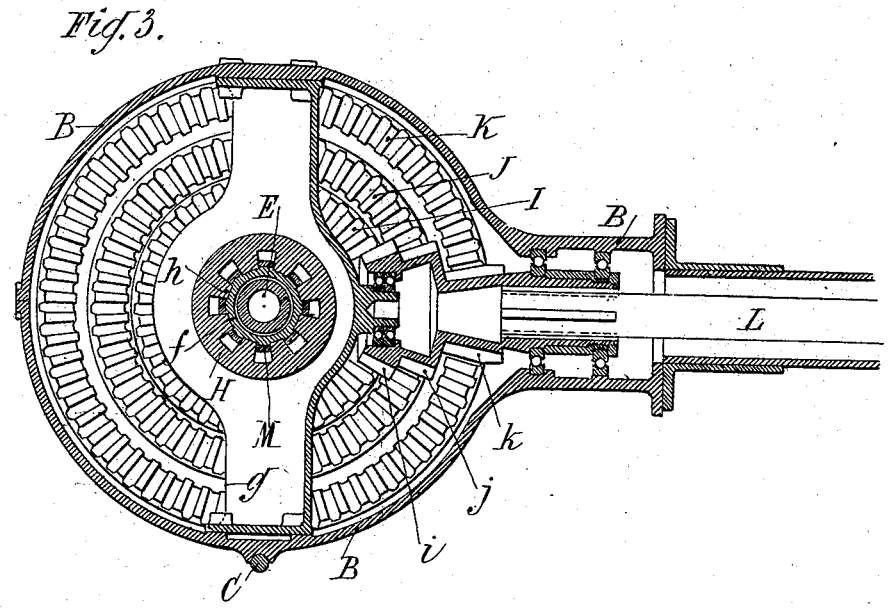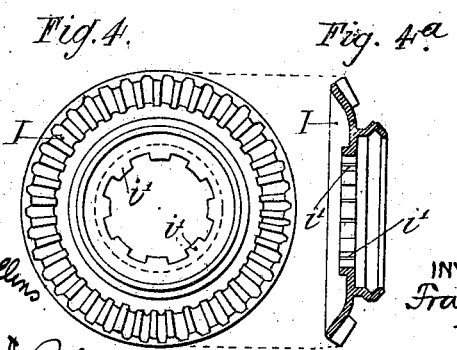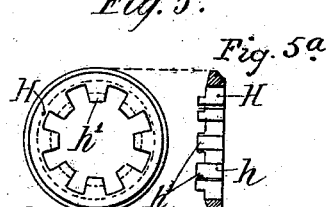

UNITED STATES PATENT OFFICE.

FRANÇOIS PILAIN, OF LYON, FRANCE.

GEARING.

No. 857,361.　　　Specification of Letters Patent.　　　Patented June 18, 1907.

Application filed August 15, 1905. Serial No. 274,320.

*To all whom it may concern:*

Be it known that I, FRANÇOIS PILAIN, a citizen of the French Republic, and a resident of 51 Rue de l'Abondance, Lyon, France, have invented a certain new and useful improvement in gearing relating especially to a live axle provided with direct change-speed gears and reverse for motor-carriages, of which the following is a specification.

This invention relates to the gearing for a live axle, which is intended for use on motor vehicles, and is provided with direct-acting change speed and reverse gear.

According to the invention, transversely slotted bearing rings or collars are secured upon a sleeve which extends from the balance gear casing and is fast thereto. Upon these bearings are mounted a number of bevel gear wheels having crowns extending down into the circular spaces between the bearing rings. These crowns are notched and are capable of being engaged one at a time by key-headed rods which are movable upon the sleeve so that the road wheels can be driven through any one of the bevel gear wheels.

The construction illustrated on the annexed drawings embodies my invention and has reference to three forward speeds and a reverse; other numbers of gears or speeds may, however, be provided for.

Figure 1:
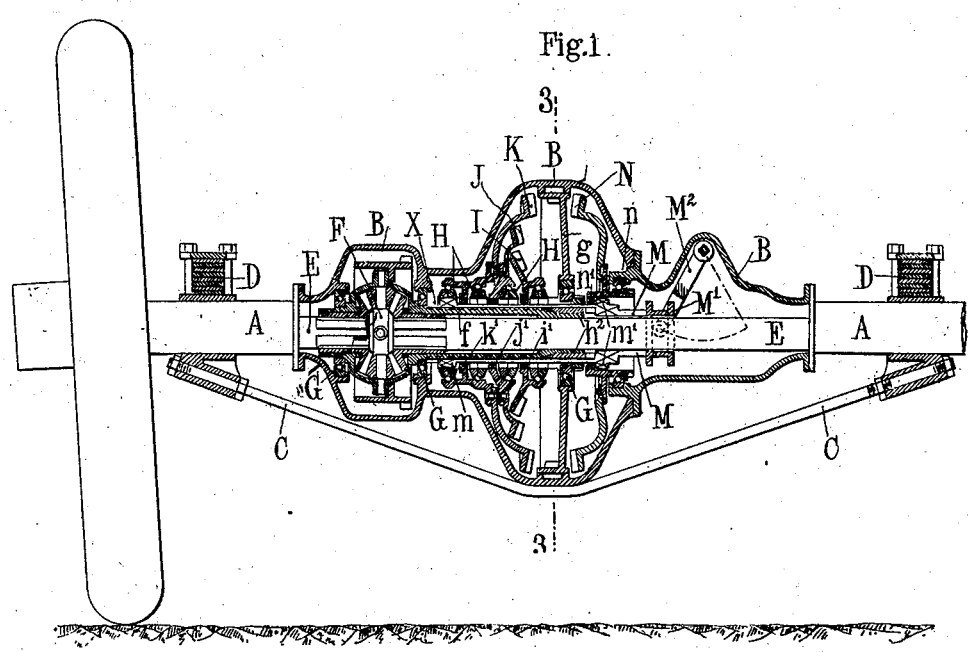
Figure 2:
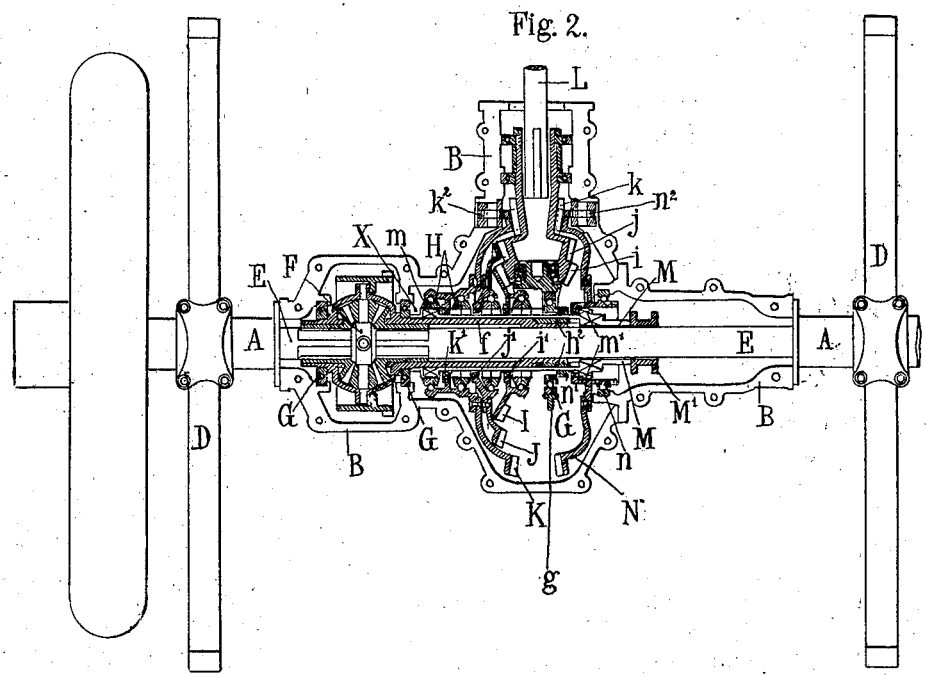

Figure 1 is a longitudinal vertical sectional elevation; Fig. 1ª is an enlarged vertical section of a part shown in Fig. 1; Fig. 2 is a horizontal sectional view; Fig. 3 is a section on line 3—3, Fig. 1ª, on the longitudinal axis of the vehicle; Figs. 4 and 4ª are detail views in elevation and section respectively; Figs. 5 and 5ª are other detail views also in elevation and section.

The fixed portion or bridge of the axle is formed by tubes A A extending on each side of the casing B, the whole forming a rigid structure provided with a strengthening rod C and attached to the usual springs D which provide for the suspension of the vehicle.

The axle proper is composed of two lengths of shaft E E extending on each side of the balance gear F up to the driving wheels, these shafts E E being connected to the wheels by any suitable arrangement.

The casing of the balance gear F is lengthened by sleeves *f* and is mounted in the gear case B upon ball bearings G G G. Secured to or formed with this casing of the balance gear are rings or collars H H H forming ball bearing races for three independent but concentric bevel wheels I J K of different diameters; the latter mesh with three pinions *i j k* formed with or secured to the driving shaft L journaled in the gear casing B and proceeding from the motor to which it is connected in the usual manner with the interposition of a universal or Cardan joint.

Each of the ball bearing rings H is formed of two parts placed together according to the construction shown in Figs. 5 and 5ª. Figs. 4 and 4ª show the construction of the bevel wheels I which run upon the bearing rings H. The wheel K is similarly formed but has a double ball bearing. The rings H are by means of their teeth *h* fitted into grooves made on the aforesaid sleeve *f* of the balance gear casing to which they are thus attached and on the sides they are furnished with projections *h'* by which they are placed together forming between them circular grooves into which toothed crowns *i' j' k'* attached to the three bevel gear wheels I J K project. The whole system of bearing rings H is clamped or held against the balance gear casing by means of a sleeve nut $h^2$, upon which is mounted the inside ring of one of the ball races G, and the outer ring of the latter is held in position by a web *g* made fast to the gear casing. Upon this differential gear casing sleeve *f* is mounted a drum formed of a set of sliding rods M which pass into and through the spaces between the teeth of the bearing rings H and those of the gear crowns *i' j' k'*; these rods M which at one end are attached to a sliding collar M' capable of being struck in either direction, are provided at their other end with key-heads *m* of suitable dimensions so as to be able to engage simultaneously with one ring H and the serrations *i' j'* or *k'* of one of the adjacent crown gear wheels I J K, thus connecting the latter with the ring and consequently with the sleeve *f* of the balance gear casing.

To the collar M' is secured a striking-fork M² mounted on a shaft connected to a controlling device within reach of the driver.

The propeller shaft pinion *k* on the side opposite to that on which it meshes with the forwardly driving bevel gear wheel K engages and rotates a rearwardly-driving bevel wheel N mounted at *n* and furnished with a ring of projections *n'* with which can engage key-heads *m'* made fast to the rods M aforesaid; these projections *m'* are arranged to engage with the projections *n'* only when the key-heads *m* occupy the space X and are completely freed from the bearing rings. It will be noted that the largest gear wheels K and N are supported close to their peripheries by bearing against rollers or sets of rollers $k^2$ and $n^2$ respectively mounted in the wall of the gear casing.

The working of this mechanism is as follows:—When the collar M' is in such a position that the keys $m$ are not engaged with any of the crowns or sleeves $i'$ $j'$ $k'$ of the gear wheels I J K and its projections $m'$ remain away from the corresponding projections $n'$ of the reversing gear wheel N, as in the case illustrated, the gear wheels driven by the three pinions on the propeller shaft revolve idly and the axle is not driven. By giving to the drum M a position such that its keys $m$ are at the same time in gear with one of the ball bearing rings H and with one of the bevel wheel crowns $i'$ $j'$ $k'$, for example with the crown $i'$ that is to say the gear wheel I, the differential and consequently the axle E E will be driven at the corresponding speed and in this particular case at the highest speed. By sliding the drum M' longitudinally the drive is effected through first the wheel J and next the wheel K and two other lower speeds are thus obtained. Between two successive speeds there is arranged a free position namely that when the keys are entirely under one of the bearing rings $i'$ $j'$ $k'$. To obtain the reverse the drum M is pushed completely to the left so that the keys enter the space X and are thus out of action; the other projections $m'$ upon the sliding rods thereupon meet the projections $n'$ of the bevel wheel N'; the axle is then driven in the reverse direction with the corresponding speed ratio. When the drum is brought back to the right the projections $m'$ move away from those $n'$ of the gear wheel N which thereupon revolves idly once more.

This mechanism thus provides three speeds forward and one reverse all of the nature known in motor car practice as "direct drive." By its combination with the body of the live axle it dispenses with the usual separate gear box for changing speeds and direction, interposed between motor and live axle. Any desired number of speeds may be used.

Having thus described my invention, what I claim as such and desire to secure by Letters Patent, is:—

1. In combination with a live axle and a driving shaft for automobile vehicles, gearing of the character described comprising a notched sleeve on the axle, bearings composed of a series of collars made fast to the sleeve by means of teeth engaging the notches, bevel wheels turning on said bearings adapted to be rotated by the driving shaft, said bevel wheels having toothed crowns between the bearings, and means adapted to be longitudinally moved between the teeth of the bearing rings and the teeth of the crowns so as to render fast any bevel gear wheel with the shaft.

2. In combination with a driving shaft provided with a pinion, a live axle and forward driving gearing operatively connecting the same, a mechanism for obtaining the reverse comprising a bevel wheel facing said forward driving gearing and meshing with said pinion on the driving shaft, said bevel wheel being provided with a toothed crown, together with a longitudinally movable drum operatively connected to the live axle and having keyheaded bars for engagement between the teeth of the toothed crown of the bevel wheel and means to operate said drum and to render the forward driving gearing inoperative during the functioning of the reverse mechanism.

In testimony whereof I have signed my name to this specification, in the presence of two subscribing witnesses.

FRANCOIS PILAIN.

Witnesses:
   Thos. N. Browne,
   Marin Vachon.